(12) United States Patent
Christie et al.

(10) Patent No.: US 6,608,140 B2
(45) Date of Patent: Aug. 19, 2003

(54) POLYMER BLENDS

(75) Inventors: Susan Katherine Christie, Edinburgh (GB); Warren Reed, Sunbury-on-Thames (GB); John Norman Reid Samson, Stirling (GB)

(73) Assignee: BP Chemicals Limited, London (GB)

( * ) Notice: Subject to any disclaimer, the term of this patent is extended or adjusted under 35 U.S.C. 154(b) by 0 days.

(21) Appl. No.: 09/776,774

(22) Filed: Feb. 6, 2001

(65) Prior Publication Data

US 2002/0004560 A1 Jan. 10, 2002

(30) Foreign Application Priority Data

Feb. 14, 2000 (GB) .............................................. 0003363

(51) Int. Cl.⁷ .......................... C08L 23/04; C08L 23/10; C08F 4/70
(52) U.S. Cl. ........................ 525/191; 525/222; 525/238; 525/240; 525/241
(58) Field of Search ................................ 525/191, 222, 525/238, 240, 241

(56) References Cited

U.S. PATENT DOCUMENTS 6,114,483 A * 9/2000 Coughlin et al. ............ 526/172

FOREIGN PATENT DOCUMENTS

WO        WO 99/46302        9/1999

OTHER PUBLICATIONS

S. Mecking, "Reactor blending with early/late transition metal catalyst combinations in ethylene polymerization," Macromolecular: Repid Communications, vol. 20, No. 3, pp. 139–143, 1999.

* cited by examiner

Primary Examiner—Nathan M. Nutter

(57) ABSTRACT

A polymer blend is disclosed which comprises a blend of (1) one or more polymers made using a late transition metal catalyst, and (2) one or more polyolefins made using a free radical process or polymerized using a Phillips type (chromium oxide) catalyst, a metallocene catalyst, or a Ziegler-Natta catalyst.

12 Claims, 1 Drawing Sheet

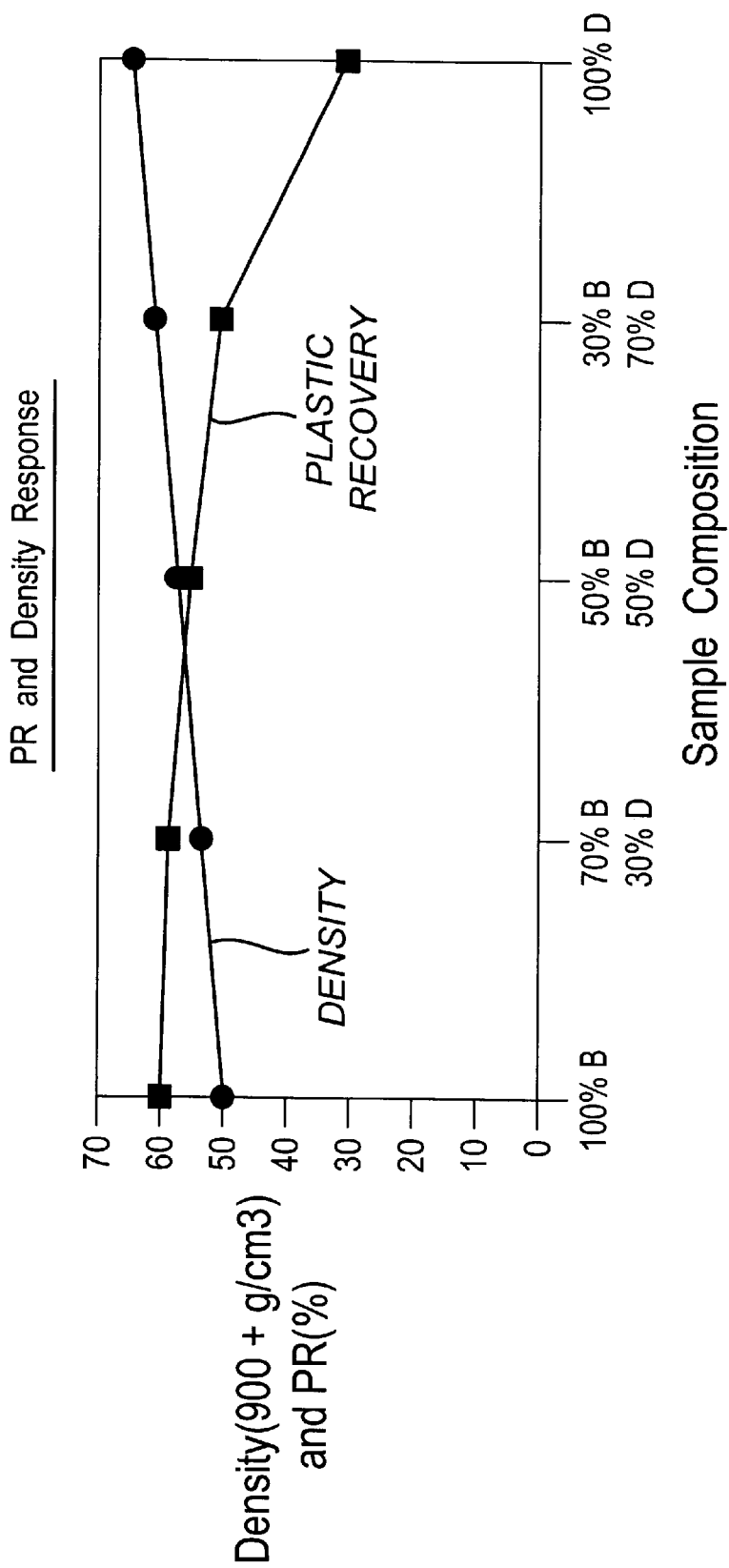
Fig. 1 Variation in density and PR response for blend of polymers B and D.

POLYMER BLENDS

The present invention relates to blends of polymers, particularly blends of polyolefins.

BACKGROUND OF THE INVENTION

The use of certain transition metal compounds to polymerise 1-olefins, for example, ethylene, is well established. The use of Ziegler-Natta catalysts, for example, those catalysts produced by activating titanium halides with organometallic compounds such as triethylaluminium, is fundamental to many commercial processes for manufacturing polyolefins. Over the last twenty or thirty years, advances in the technology have led to the development of Ziegler-Natta catalysts which have such high activities that olefin polymers and copolymers containing very low concentrations of residual catalyst can be produced directly in commercial polymerisation processes. The quantities of residual catalyst remaining in the produced polymer are so small as to render unnecessary their separation and removal for most commercial applications. Such processes can be operated by polymerising the monomers in the gas phase, or in solution or in suspension in a liquid hydrocarbon diluent. Polymerisation of the monomers can be carried out in the gas phase (the "gas phase process"), for example by fluidising under polymerisation conditions a bed comprising the target polyolefin powder and particles of the desired catalyst using a fluidising gas stream comprising the gaseous monomer. In the so-called "solution process" the (co)polymersation is conducted by introducing the monomer into a solution or suspension of the catalyst in a liquid hydrocarbon diluent under conditions of temperature and pressure such that the produced polyolefin forms as a solution in the hydrocarbon diluent. In the "slurry process" the temperature, pressure and choice of diluent are such that the produced polymer forms as a suspension in the liquid hydrocarbon diluent. These processes are generally operated at relatively low pressures (for example 10–50 bar) and low temperature (for example 50 to 150° C.). Commodity polyethylenes are commercially produced in a variety of different types and grades. Homopolymerisation of ethylene with transition metal based catalysts leads to the production of so-called "high density" grades of polyethylene. These polymers have relatively high stiffness and are useful for making articles where inherent rigidity is required. Copolymerisation of ethylene with higher 1-olefins (e.g., butene, hexene or octene) is employed commercially to provide a wide variety of copolymers differing in density and in other important physical properties. Particularly important copolymers made by copolymerising ethylene with higher 1-olefins using transition metal based catalysts are the copolymers having a density in the range of 0.91 to 0.93. These copolymers which are generally referred to in the art as "linear low density polyethylene" are in many respects similar to the so called "low density" polyethylene produced by the high pressure free radical catalysed polymerisation of ethylene. Such polymers and copolymers are used extensively in the manufacture of flexible blown film.

WO 99/12981 discloses that ethylene may be polymerised by contacting it with certain Fe, Co, Mn or Ru complexes of selected 2,6-pyridinecarboxyaldehydebis(imines) and 2,6-diacylpyridinebis(imines); and WO 99/46302 discloses catalysts comprising a mixture of complexes such as those disclosed in WO 99/12981 and other known catalysts for the polymerisation of 1-olefins, such as Phillips (chromium) catalysts, Zeigler catalysts or metallocenes.

SUMMARY OF THE INVENTION

We have discovered that blending two or more polymers, one of which has been made using a catalyst such as the above-mentioned iron catalyst, and another of which has been made using a different catalyst, can result in polymers whose properties are synergistic—ie are more than merely additive.

Thus the present invention provides a 1-olefin polymer comprising a blend of
(1) one or more polymers made using a late transition metal catalyst, and
(2) one or more polyolefins made using a free radical process or polymerised using a Phillips type (chromium oxide) catalyst, a metallocene catalyst, or a Ziegler-Natta catalyst.

BRIEF DESCRIPTION OF THE DRAWINGS

FIG. 1 shows the relationship between the density and plastic recovery (PR) of polymers B and D.

DETAILED DESCRIPTION OF THE INVENTION

By "late transition metal" is meant a metal from Groups VIIIb or Ib (Groups 8–11) of the Periodic Table. In particular the metals Fe, Co, Ni, Ru, Rh, Pd, Os, Ir, and Pt are preferred, especially Fe, Co and Ni.

Preferably the late transition metal catalyst comprises a compound of the Formula (I):

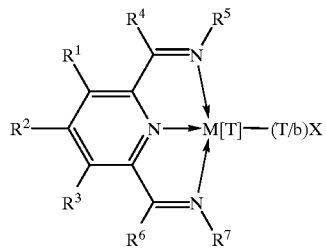

Formula (I)

wherein M is Fe[II], Fe[III], Co[I], Co[II], Co[III], Mn[I], Mn[II], Mn[III], Mn[IV], Ru[II], Ru[III] or Ru[IV]; X represents an atom or group covalently or ionically bonded to the transition metal M; T is the oxidation state of the transition metal M and b is the valency of the atom or group X; $R^1$, $R^2$, $R^3$, $R^4$, $R^5$, $R^6$ and $R^7$ are independently selected from hydrogen, halogen, hydrocarbyl, substituted hydrocarbyl, heterohydrocarbyl or substituted heterohydrocarbyl; and when any two or more of $R^1$ –$R^7$ are hydrocarbyl, substituted hydrocarbyl, heterohydrocarbyl or substituted heterohydrocarbyl, said two or more can be linked to form one or more cyclic substituents.

We have found that such blends, particularly when polymer (1) is derived from a catalyst comprising a complex of the formula (I) above, and the polymer (2) is derived from a Phillips (chromium oxide) catalyst, show Plastic Recovery values (PR) greater than the weighted average of the Plastic Recovery values of the two components. (Plastic Recovery is defined in the Examples below.) Accordingly it is preferred that in the polymer blends of the invention, the ratio of the Plastic Recovery of the blend to that of the weighted average of the individual polymer components is greater than 1, preferably greater than 1.1, and more preferably greater than 1.2. It is also preferred that the blend comprises at least 70 wt % of component (1) and no more than 30 wt % of component (2).

Typical free radical processes for the polymerisation of ethylene are described in High Polymers Vol XX (Crystalline Olefin Polymers Editors R. A. Raff, K. W. Doak, 1965, Interscience Publishers). Ethylene, optionally together with other comonomers which can be polymerised by radical methods such as ethyl acrylate and vinyl acetate, may be polymerised in stirred autoclave or tubular reactors at high pressure (typically 180–350 Mpa) and temperatures (typically 150–350° C.). The reaction is started and subsequently controlled by the metered addition of one or more initiator compounds which decompose at the desired reaction temperature to generate reactive free radical species. Suitable initiators are well known to those skilled in the art and typically contain peroxide or azo bonds which are capable of thermal homolytic dissociation. Chain transfer agents are also commonly added to help control molecular weight.

A typical Phillips type catalyst employs a combination of a support material to which has first been added a chromium-containing material wherein at least part of the chromium is in the hexavalent state by heating in the presence of molecular oxygen. The support is generally composed of about 80 to 100 wt. % silica, the remainder, if any, being selected from the group consisting of refractory metal oxides, such as aluminium, boria, magnesia, thoria, zirconia, titania and mixtures of two or more of these refractory metal oxides. Supports can also comprise alumina, aluminium phosphate, boron phosphate and mixtures thereof with each other or with silica.

The chromium compound is typically added to the support as a chromium (III) compound such as the acetate or acetylacetonate in order to avoid the toxicity of chromium (VI). The raw catalyst is then calcined in air at a temperature between 250 and 1000° C. for a period of from a few seconds to several hours. This converts at least part of the chromium to the hexavalent state. Reduction of the Cr VI to its active form normally occurs in the polymerisation reaction, but can be done at the end of the calcination cycle with CO at about 350° C.

Fluorine, aluminium and/or titanium may be added to the raw Phillips catalyst to modify it.

Metallocenes may typically be represented by the general formula:

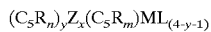

where ($C_5R_x$)$_n$ and ($C_5R_m$) are cyclopentadienyl ligands,

R is hydrogen, alkyl, aryl, alkenyl, etc.

M is a Group IVA metal

Z is a bridging group,

L is an anionic ligand, and y is 0, 1 or 2, n and m are from 1 to 5, x is 0 or 1.

The most preferred complexes are those wherein y is 1 and L is halide or alkyl. Typical examples of such complexes are bis (cyclopentadienyl) zirconium dichloride and bis (cyclopentadienyl zirconium dimethyl. In such metallocene complexes the cyclopentadienyl ligands may suitably be substituted by alkyl groups such as methyl, n-butyl or vinyl. Alternatively the R groups may be joined together to form a ring substituent, for example indenyl or fluorenyl. The cyclopentadienyl ligands may be the same or different. Typical examples of such complexes are bis(n-butylcyclopentadienyl) zirconium dichloride or bis (methylcyclopentadienyl) zirconium dichloride.

Further examples of metallocene complexes are those wherein the anionic ligand represented in the above formula is replaced with a diene moiety. In such complexes the transition metal may be in the +2 or +4 oxidation state and a typical example of this type of complex is ethylene bis indenyl zirconium (II) 1,4-diphenyl butadiene. Examples of such complexes may be found in EP 775148A the disclosure of which is incorporated herein by reference.

Ziegler-Natta catalysts, in general, consist of two main components. One component is an alky or hydride of a Group I to III metal, most commonly Al(Et)$_3$ or Al(iBu)$_3$ ro Al(Et)$_2$Cl but also encompassing Grignard reagents, n-butyllithium, or dialkylzinc compounds. The second component is a salt of a Group IV to VIII transition metal, most commonly halides of titanium or vanadium such as TiCl$_4$, TiCl$_3$, VCl$_4$, or VOCl$_3$. The catalyst components when mixed, usually in a hydrocarbon solvent, may form a homogeneous or heterogeneous product. Such catalysts may be impregnated on a support, if desired, by means known to those skilled in the art and so used in any of the major processes known for co-ordination catalysis of polyolefins such as solution, slurry, and gas-phase. In addition to the two major components described above, minor amounts of other compounds (typically electron donors) may be added to further modify the polymerisation behaviour or activity of the catalyst. A wide variety of monomers may thus be polymerised by Ziegler-Natta catalysts. Depending on the particular components used, and the specific method of combination, it is possible to produce catalysts which are very effective for the polymerisation and copolymerisation of ethylene, dienes, and higher alpha-olefins. Particularly important applications for Ziegler-Natta catalysts are for the manufacture of high molecular weight ethylene copolymers and isotactic polypropene.

In the complex of Formula (I), $R^5$ and $R^7$ are preferably independently selected from substituted or unsubstituted alicyclic, heterocyclic or aromatic groups, for example, phenyl, 1-naphthyl, 2-naphthyl, 2-methylphenyl, 2-ethylphenyl, 2,6-diisopropylphenyl, 2,3-diisopropylphenyl, 2,4-diisopropylphenyl, 2,6-di-n-butylphenyl, 2,6-dimethylphenyl, 2,3-dimethylphenyl, 2,4-dimethylphenyl, 2-t-butylphenyl, 2,6-diphenylphenyl, 2,4,6-trimethylphenyl, 2,6-trifluoromethylphenyl, 4-bromo-2,6-dimethylphenyl, 3,5 dichloro-2,6-diethylphenyl, and 2,6,bis (2,6-dimethylphenyl)phenyl, cyclohexyl and pyridinyl.

In one embodiment at least one and preferably both of $R^4$ and $R^6$ is a hydrocarbyl group having at least two carbon atoms. Preferably at least one of $R^4$ and $R^6$ has from 2 to 12 carbon atoms, and more preferably from 3 to 10 carbon atoms. Preferred such groups for $R^4$ and $R^6$ are ethyl, isopropyl, t-butyl, phenyl or CH$_2$CH$_2$Ph.

In a preferred embodiment $R^5$ is represented by the group "P" and $R^7$ is represented by the group "Q" as follows:

Group P

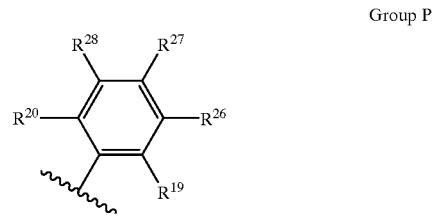

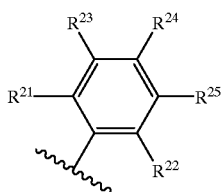
Group Q wherein R¹⁹ to R²⁸ are independently selected from hydrogen, halogen, hydrocarbyl, substituted hydrocarbyl, heterohydrocarbyl or substituted heterohydrocarbyl; when any two or more of R¹ to R⁴, R⁶ and R¹⁹ to R²⁸ are hydrocarbyl, substituted hydrocarbyl, heterohydrocarbyl or substituted heterohydrocarbyl, said two or more can be linked to form one or more cyclic substituents.

The ring systems P and Q are preferably independently 2,6-hydrocarbylphenyl or fused-ring polyaromatic, for example, 1-naphthyl, 2-naphthyl, 1-phenanthrenyl and 8-quinolinyl.

Preferably at least one of R¹⁹, R²⁰, R²¹ and R²² is hydrocarbyl, substituted hydrocarbyl, heterohydrocarbyl or substituted heterohydrocarbyl. More preferably at least one of R¹⁹ and R²⁰, and at least one of R²¹ and R²², is hydrocarbyl, substituted hydrocarbyl, heterohydrocarbyl or substituted heterohydrocarbyl. Most preferably R¹⁹, R²⁰, R²¹ and R²² are all independently selected from hydrocarbyl, substituted hydrocarbyl, heterohydrocarbyl or substituted heterohydrocarbyl. R¹⁹, R²⁰, R²¹ and R²² are preferably independently selected from methyl, ethyl, n-propyl, iso-propyl, n-butyl, sec-butyl, tert.-butyl, n-pentyl, neopentyl, n-hexyl, 4-methylpentyl, n-octyl, phenyl and benzyl.

R¹, R², R³, R⁴, R⁶, R¹⁹, R²⁰, R²¹, R²², R²³, R²⁵, R²⁶ and R²⁸ are preferably independently selected from hydrogen and C₁ to C₈ hydrocarbyl, for example, methyl, ethyl, n-propyl, n-butyl, t-butyl, n-hexyl, n-octyl, phenyl and benzyl.

In one embodiment R²⁴ and R²⁷ are either both halogen or at least one of them has two or more carbon atoms.

In an alternative embodiment R⁵ is a group having the formula —NR²⁹R³⁰ and R⁷ is a group having the formula —NR³¹R³², wherein R²⁹ to R³² are independently selected from hydrogen, halogen, hydrocarbyl, substituted hydrocarbyl, heterohydrocarbyl or substituted heterohydrocarbyl; when any two or more of R¹ to R⁴, R⁶ and R²⁹ to R³² are hydrocarbyl, substituted hydrocarbyl, heterohydrocarbyl or substituted heterohydrocarbyl, said two or more can be linked to form one or more cyclic substituents.

Each of the nitrogen atoms is coordinated to the metal by a "dative" bond, ie a bond formed by donation of a lone pair of electrons from the nitrogen atom. The remaining bonds on each of these atoms are covalent bonds formed by electron sharing between the atoms and the organic ligand as shown in the defined formula for the metal complex illustrated above.

The atom or group represented by X in the compounds of Formula (I) can be, for example, selected from halide, sulphate, nitrate, thiolate, thiocarboxylate, BF₄⁻, PF₆⁻, hydride, hydrocarbyloxide, carboxylate, hydrocarbyl, substituted hydrocarbyl and heterohydrocarbyl, or β-diketonates. Examples of such atoms or groups are chloride, bromide, methyl, ethyl, propyl, butyl, octyl, decyl, phenyl, benzyl, methoxide, ethoxide, isopropoxide, tosylate, triflate, formate, acetate, phenoxide and benzoate. Preferred examples of the atom or group X in the compounds of Formula (I) are halide, for example, chloride, bromide; hydride; hydrocarbyloxide, for example, methoxide, ethoxide, isopropoxide, phenoxide; carboxylate, for example, formate, acetate, benzoate; hydrocarbyl, for example, methyl, ethyl, propyl, butyl, octyl, decyl, phenyl, benzyl; substituted hydrocarbyl; heterohydrocarbyl; tosylate; and triflate. Preferably X is selected from halide, hydride and hydrocarbyl. Chloride is particularly preferred.

The following are examples of nitrogen-containing transition metal complexes that can be employed in the catalyst of the present invention:
2,6-diacetylpyridinebis(2,6-diisopropylanil)FeCl₂
2,6-diacetylpyridinebis(2,6-diisopropylanil)MnCl₂
2,6-diacetylpyridinebis(2,6-diisopropylanil)CoCl₂
2,6-diacetylpyridinebis(2-tert.-butylanil)FeCl₂
2,6-diacetylpyridinebis(2,3-dimethylanil)FeCl₂
2,6-diacetylpyridinebis(2-methylanil)FeCl₂
2,6-diacetylpyridinebis(2,4-dimethylanil)FeCl₂
2,6-diacetylpyridinebis(2,6-dimethylanil)FeCl₂
2,6-diacetylpyridinebis(2,4,6-trimethylanil)FeCl₂
2,6-diacetylpyridinebis(2,6-dimethyl 4-t-butyl anil)FeCl₂
2,6-dialdiminepyridinebis(2,6-dimethylanil)FeCl₂
2,6-dialdiminepyridinebis(2,6-dimethylanil)FeCl₂
2,6-dialdiminepyridinebis(2,6-diisopropylanil)FeCl₂
2,6-dialdiminepyridinebis(1-naphthil)FeCl₂ and
2,6-bis(1,1-diphenylhydrazone)pyridine.FeCl₂.

The catalyst formed from the complex of Formula (I) may also include an activator selected from organoaluminium compounds and hydrocarbylboron compounds, and optionally also a neutral Lewis base. Details of these additional components of the catalyst may be found in WO99/12981.

A preferred support is silica, and a preferred activator (2) is methylalumoxane (MAO).

The present invention further provides a process for the formation of a polymer blend, comprising blending together (1) one or more polymers made using as catalyst a complex of the formula (I) as defined above, (2) one or more polyolefins made using a free radical process or polymerised using a Phillips type (chromium oxide) catalyst, a metallocene catalyst, or a Ziegler-Natta catalyst.

The polymerisation conditions for making each polymer (1) and (2) can be, for example, solution phase, slurry phase, gas phase or bulk phase, with polymerisation temperatures ranging from −100° C. to +300° C., and at pressures of atmospheric and above, particularly from 140 to 4100 kPa. If desired, the catalyst can be used to polymerise ethylene under high pressure/high temperature process conditions wherein the polymeric material forms as a melt in supercritical ethylene. Preferably the polymerisation is conducted under gas phase fluidised bed or stirred bed conditions. Typical polymerisation conditions for production of polymer (1) are disclosed in WO99/12981.

Suitable monomers for use in the polymerisation processes to produce polymers (1) and (2) are, for example, ethylene and C₂₋₂₀ α-olefins, specifically propylene, 1-butene, 1-pentene, 1-hexene, 4-methylpentene-1, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, and 1-eicosene. Other monomers include methyl methacrylate, methyl acrylate, butyl acrylate, acrylonitrile, vinyl acetate, and styrene. Preferred monomers for homopolymerisation processes are ethylene and propylene.

Copolymers of ethylene or propylene with each other or with other 1-olefins such as 1-butene, 1-hexene, 4-methylpentene-1, and octene, or with other monomeric materials, for example, methyl methacrylate, methyl acrylate, butyl acrylate, acrylonitrile, vinyl acetate, and styrene may also be used.

Propylene polymers (1) include propylene homopolymer and copolymers of propylene with less than 50 mole % ethylene or other alpha-olefin such as butene-1, pentene-1, 4-methylpnetene-1, or hexane-1, or mixtures thereof. Propylene polymers also may include copolymers of propylene with minor amounts of copolymerizable monomer. Typically, most useful are normally-solid polymers of propylene containing polypropylene crystallinity, random copolymers of propylene with up to about 10 wt. % ethylene, and impact copolymers containing up to about 20 wt. % ethylene or other alpha-olefin. Polypropylene homopolymers may contain a small amount (typically below 2 wt. %) of other monomers to the extent the properties of the homopolymer are not affected significantly.

The polymers (1) and (2) made as described above may be blended by conventional blending techniques. They may blended as powders or as pellets, and then extruded or compounded. Depending upon the use of the polymer product, minor amounts of additives are typically incorporated into the polymer formulation such as acid scavengers, antioxidants, stabilizers, and the like. Generally, these additives are incorporated at levels of about 25 to 2000 ppm, typically from about 50 to about 1000 ppm, and more typically 400 to 1000 ppm, based on the polymer.

In use, blends made according to the invention in the form of a powder are conventionally compounded into pellets. Examples of uses for polymer blends made according to the invention include use to form fibres, extruded films, tapes, spunbonded webs, moulded or thermoformed products, and the like. The polymers may be blown into films, or may be used for making a variety of moulded or extruded articles such as pipes, and containers such as bottles or drums. Specific additive packages for each application may be selected as known in the art. Examples of supplemental additives include slip agents, anti-blocks, anti-stats, mould release agents, primary and secondary anti-oxidants, clarifiers, nucleants, uv stabilizers, and the like. Classes of additives are well known in the art and include phosphite antioxidants, hydroxylamine (such as N,N-dialkyl hydroxylamine) and amine oxide (such as dialkyl methyl amine oxide) antioxidants, hindered amine light (uv) stabilizers, phenolic stabilizers, benzofuranone stabilizers, and the like. Various olefin polymer additives are described in U.S. Pat. Nos. 4,318,845, 4,325,863, 4,590,231, 4,668,721, 4,876,300, 5,175,312, 5,276,076, 5,326,802, 5,344,860, 5,596,033, and 5,625,090.

Fillers such as silica, glass fibers, talc, and the like, nucleating agents, and colourants also may be added to the polymer compositions as known by the art.

EXAMPLES

Example 1

Preparation of Catalysts (i) The catalyst used for producing polymer (1) was 2,6-diacetylpyridinebis (2,4,6 trimethyl anil)$FeCl_2$ supported on silica. It was made as described in detail in WO 99/46304.

(iia) EP30X is a silica supported Phillips catalyst supplied by Crosfield, Warrington (UK). It has a typical pore volume of 1.6 ml/g and surface area of 320 $m^2/g$.

It contains typically 1% wt Cr.

(iib) Magnapore 963 is supplied by Grace-Davison. It is a titanium dioxide promoted silica gel catalyst containing nominally 1% Cr.

Example 2

Pilot Scale Polymerisations

A 93 liter Phillips continuous polymerisation loop reactor was used for the polymerisations. Ethylene, isobutane diluent, and catalyst were metered into the reactor to maintain the reaction conditions as detailed in Table 1 below. When the complex (i) was catalyst both hydrogen and aluminium alkyl solution were additionally metered to the reactor. The reactor was operated at 600 psig and 90° C. with polyethylene throughput of approximately 7.5–10 kg/hour.

Further details of polymerisation using the iron catalyst (i) can be found in WO 99/46304. The Phillips catalyst, Magnapore 963, was activated by fluidisation in air at 700° C./5 hours, prior to cooling to 300° C. and blanketing/storage under nitrogen prior to use. Details of the polymerisations for some of the polymers used in the blends below are given in Table 1: those not shown were polymerised under similar conditions.

The activation procedure was typical of that routinely employed in handling of such catalysts.

TABLE 1

| Reaction conditions | A | E | F | G | H |
|---|---|---|---|---|---|
| Catalyst | (iib) | (i) | (i) | (i) | (i) |
| Temperature (° C.) | 90 | 90 | 90 | 90 | 90 |
| Catalyst Productivity (g/g) | 6450 | 12000 | 13500 | 10100 | 6750 |
| Solids (wt %) | 29.5 | 24 | 22.5 | 24.2 | 25 |
| Ethylene (vol %) | 11.5 | 15 | 16.5 | 12.7 | 8.5 |
| Hydrogen (vol %) | 0 | 0.12 | 0.5 | 0.9 | 1.15 |
| Aluminum alkyl (TIBAL) × $10^{-3}$ M/hr | 0 | 9.6 | 9.6 | 9 | 9 |
| Residence time (hours) | 1.9 | 1.7 | 1.1 | 1.4 | 1.6 |
| Product: | | | | | |
| HLMI (21.6 kg: g/10 mins) | 11.4 | 9.4 | 21.6 | 122 | 310 |
| MI (21.6 kg: g/10 mins) | 0.14 | 0.14 | 0.36 | 2.14 | 6.7 |
| Annealed density (kg/$m^3$) | 947 | 961.8 | 963.4 | 967.6 | 968.7 |

The following base polymers were made using the above catalysts:

| Sample | Catalyst type | Catalyst System | Production reactor |
|---|---|---|---|
| A | (ii) | Magnapore 963 | PF2 |
| B | (ii) | EP30 | Rigidex |
| C | (ii) | Magnapore 963 | Rigidex |
| D | (i) | Fe6 | PF2 |
| E | (i) | Fe6 | PF2 |
| F | (i) | Fe6 | PF2 |
| G | (i) | Fe6 | PF2 |
| H | (i) | Fe6 | PF2 |

Example 3

Blend Preparation

Polymers prepared using catalyst type (1) were blended with polymers prepared either using EP30 or Magnapore 963 to provide 200–400 g of each blend. Where the feedstocks of the blend were powder the components were premixed together as powder/powder blends with a 2:1 Irgafos 168: Irganox 1076 additive package added at 900 ppm level. Pellet/pellet blends were premixed as pellet to the required composition loadings prior to compounding.

Each blend was compounded on a laboratory scale Prism 16 mm twin screw extruder using a flat melt profile of 180°

C. across the feed, barrel, and die zones and a screw speed of 185 rpm and an output of 1.5 kg/hr. The feed was adjusted to maintain a constant torque of 60% with each sample to ensure similar processing treatment. The strand was water cooled and pelletised.

Blend Properties

The physical properties of the blends were evaluated, and are shown in Table 2 below.

Melt Mass-Flow Rate (MFR)

Melt Mass-Flow Rate of the materials was measured to ISO 1133:1997-condition 7. The value quoted is MFR in dg/min.

Annealed density

This was measured to specification ISO 1872–1:1993 using test method ISO 1183:1987.

Plastic Recovery (PR)

This was measured as follows. A sample of polymer is extruded through a standard melt flow rate at 190° C. in accordance with ISO 1133:1997—condition 7 and the extrudate left to cool to ambient temperature. The extrudate diameter is measured at two points (within 6 mm of the lower end) and the average of these two measurements taken to be the average mean diameter. PR is then calculated as $$PR\% = 100 \times \frac{\text{Mean diameter of extrudate} - \text{diameter of die orifice}}{\text{Diameter of die orifice}}$$

TABLE 2

| Blend | MFR 2.16 kg g/10 min | MFR 21.6 kg g/10 min | MFR ratio | PR 2.16 kg (%) | PR 21.6 kg (%) | Annealed Density (kg/m³) |
|---|---|---|---|---|---|---|
| 100% B | 0.26 | 26.6 | 102 | 60 | 96 | 950.5 |
| 100% D | 0.48 | 30.7 | 64 | 30 | 92 | 965.4 |
| 70% B, 30% D | 0.30 | 25.3 | 84 | 58 | 90 | 954.0 |
| 50% B, 50% D | 0.33 | 26.0 | 79 | 55 | 86 | 957.4 |
| 30% B, 70% D | 0.36 | 26.9 | 75 | 50 | 86 | 960.9 |
| 100% A | 0.14 | 11.4 | | 44 | 80 | 947.4 |
| 70% A, 30% F | 0.19 | 13.6 | | 43 | 82 | 951.5 |
| 30% A, 70% F | 0.27 | 17.9 | | 38 | 85 | 958.6 |
| 100% F | 0.36 | 21.6 | | 27 | 79 | 963.4 |
| 100% C | 0.11 | 8.6 | | 43 | 68 | 951.4 |
| 30% C, 70% D | 0.34 | 21.1 | | 39 | 84 | 961.8 |

Summary Comments

The relationship of density and PR for a range of blends of polymers B and D is shown in FIG. 1. It can be seen that the PR of the bend is greater than the weighted average of the two components (which would be a straight line between the two end-points).

The materials were readily compounded—good strand quality was apparent which is an indication of good compatibility and mixing.

The density and MI response essentially follow the standard linear mixing laws.

These Phillips/iron catalyst blends demonstrate that desirable Phillips like swell and MFR can be obtained in iron catalyst blend systems at low Phillips % presence. Very high density materials with Phillips type basic properties have been produced.

An advantage of such blend behaviour is the ability to provide a product combining the advantaged characteristics of two dissimilar polymers. Thus in the present examples, mechanical properties conferred by the major (Fe catalyst) component such as higher density, modulus, and impact performance can be provided together with key processability characteristics more typical of Phillips grades, thus facilitating the handling of these materials by fabricators on current processing equipment without major adjustment.

We claim:

1. A polymer blend comprising a blend of component (1) comprising one or more polymers made using a late transition metal catalyst of Formula (I):

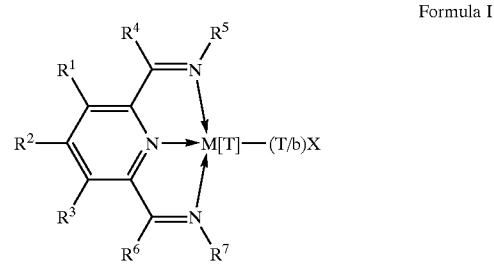

Formula I wherein M is Fe[II], Fe[III], Co[I], Co[II], Co[III], Mn[I], Mn[II], Mn[III], Mn[IV], Ru[II], Ru[[III] or Ru[IV]; X represents an atom or group covalently or ionically bonded to the transition metal M; T is the oxidation state of the transition metal M and b is the valency of the atom or group X; $R^1$, $R^2$, $R^3$, $R^4$, $R^5$, $R^6$ and $R^7$ are independelty selected from hydrogen, halogen, hydrocarbyl, substituted hydrocarbyl, heterohydrocarbyl or substituted heterohydrocarbyl; and when any two or more of $R^1$–$R^7$ are hydrocarbyl, substituted hydrocarbyl, heterohydrocarbyl or substituted heterohydrocarbyl, said two or more of $R^1$–$R^7$ can be linked to form one or ore cyclic substituents, and component (2) comprising one or more polyolefins made (a) using a free radical polymerisation process, (b) using a polymerisation process catalysed by a Philips supported-chromium oxide catalyst, (c) using a metallocene polymerization catalyst, or (d) using a Ziegler-Natta catalyst, wherein the blend is made by blending together components (1) and (2) in the form of powder or pellets.

2. Polymer blend according to claim 1, wherein $R^5$ is represented by the group "P" and $R^7$ is represented by the group "Q" as follows:

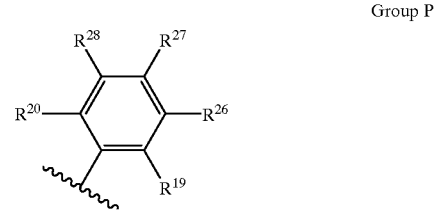

Group P

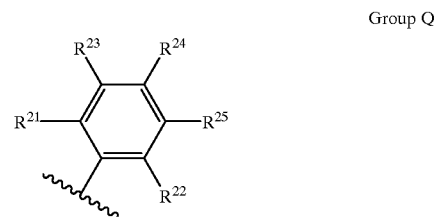

Group Q wherein $R^{19}$ to $R^{28}$ are independently selected from hydrogen, halogen, hydrocarbyl, substituted hydrocarbyl, heterohydrocarbyl or substituted heterohydrocarbyl; when any two or more of $R^1$ to $R^4$, $R^6$ and $R^{19}$ to $R^{28}$ are hydrocarbyl, substituted hydrocarbyl, heterohydrocarbyl or substituted heterohydrocarbyl, said two or more can be linked to form one or more cyclic substituents.

3. Polymer blend according to claim 2, wherein $R^1$, $R^2$, $R^3$, $R^4$, $R^6$, $R^{19}$, $R^{20}$, $R^{21}$, $R^{22}$, $R^{23}$, $R^{25}$, $R^{26}$ and $R^{28}$ are each independently hydrogen, methyl, ethyl, n-propyl, n-butyl, t-butyl, n-hexyl, n-octyl, phenyl or benzyl.

4. Polymer blend according to claim 2, wherein the groups P and Q are each independently phenyl, 2-methylphenyl, 2-ethylphenyl, 2,6-diisopropylphenyl, 2,3-diisopropylphenyl, 2,4-diisopropylphenyl, 2,6-di-n-butylphenyl, 2,6-dimethylphenyl, 2,3-dimethylphenyl, 2,4-dimethylphenyl, 2-t-butylphenyl, 2,6-diphenylphenyl, 2,4,6-trimethylphenyl, 2,6-trifluoromethylphenyl, 4-bromo-2,6-dimethylphenyl, 3,5-dichloro2,6-diethylphenyl, or 2,6-bis(2,6-dimethylphenyl)phenyl.

5. Polymer blend according to claim 1, wherein X is chloride, bromide; hydride; methoxide, ethoxide, isopropoxide, phenoxide; formate, acetate, benzoate; methyl, ethyl, propyl, butyl, octyl, decyl, phenyl, benzyl; substituted hydrocarbyl; heterohydrocarbyl; tosylate; or triflate.

6. Polymer blend according to claim 1, wherein the late transition metal catalyst comprises one or more of the following:
2,6-diacetylpyridinebis(2,6-diisopropylanil)FeCl$_2$
2,6-diacetylpyridinebis(2,6-diisopropylanil)MnCl$_2$
2,6-diacetylpyridinebis(2,6-diisopropylanil)CoCl$_2$
2,6-diacetylpyridinebis(2-tert.-butylanil)FeCl$_2$
2,6-diacetylpyridinebis(2,3-dimethylanil)FeCl$_2$
2,6-diacetylpyridinebis(2-methylanil)FeCl$_2$
2,6-diacetylpyridinebis(2,4-dimethylanil)FeCl$_2$
2,6-diacetylpyridinebis(2,6-dimethylanil)FeCl$_2$
2,6-diacetylpyridinebis(2,4,6-trimethylanil)FeCl$_2$
2,6-diacetylpyridinebis(2,6-dimethyl 4-t-butyl anil)FeCl$_2$
2,6-dialdimlnepyridinebis(2,6-dimethylanil)FeCl$_2$
2,6-dialdiminepyridinebis(2,6-diethylanil)FeCl$_2$
2,6-dialdiminepyridinebis(2,6-diisopropylanil)FeCl$_2$
2,6-dialdiminepyridinebis(1-naphthil)FeCl$_2$ and
2,6-bis(1,1-diphenylhydrazone)pyridine)FeCl$_2$.

7. Polymer blend according to claim 1, wherein the ratio of the Plastic Recovery of the blend to that of the weighted average of the individual polymer components is greater than 1.

8. Polymer blend according to claim 1, wherein component (1) is a polymer of a monomer selected from ethylene, propylene, 1-butene, 1-pentene, 1-hexene, 4-methylpentene-1, 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, methyl methacrylate, methyl acrylate, butyl acrylate, acrylontrile, vinyl acetate, and styrene.

9. Polymer blend according to claim 8, wherein component (1) is a homopolymer of a monomer selected from ethylene and propylene.

10. Polymer blend according to claim 1, wherein the polyolefin of component (2) is polymerised using a Phillips supported-chromium oxide catalyst supported on 80 to 100 wt % of silica, the remainder, if any, being selected from the group consisting of refractory metal oxides of aluminum, boria, magnesia, thoria, zirconia and titania.

11. Polymer blend according to claim 10, which comprises at least 70 wt % of component (1) and no more than 30 wt % of component (2).

12. Polymer blend according to claim 10, wherein the density of said blend is greater than that of the polymer(s) of component (2).

* * * * *